Sept. 30, 1952          J. D. STUTT          2,612,397
AUTOMOBILE REAR DOOR LATCH
Filed Dec. 19, 1949          2 SHEETS—SHEET 2
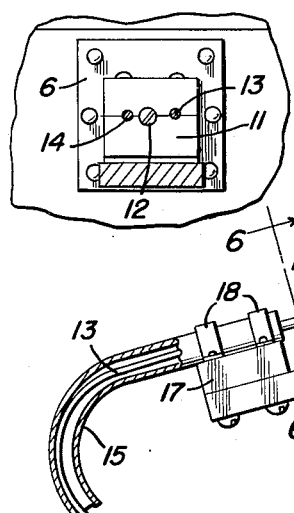
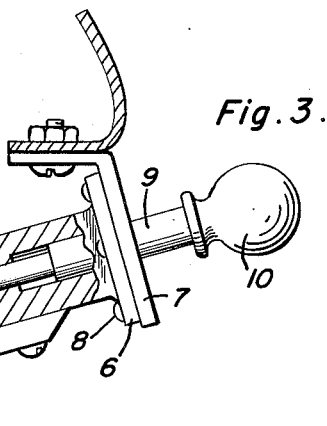
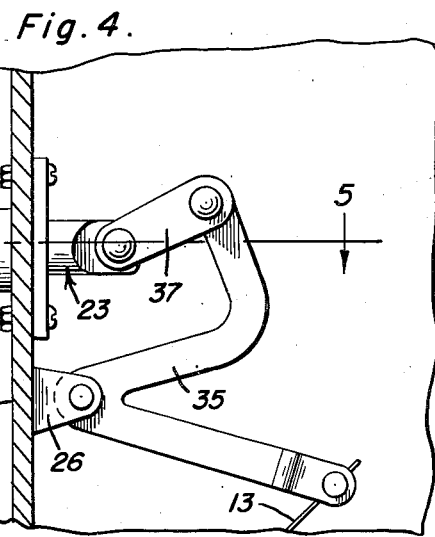
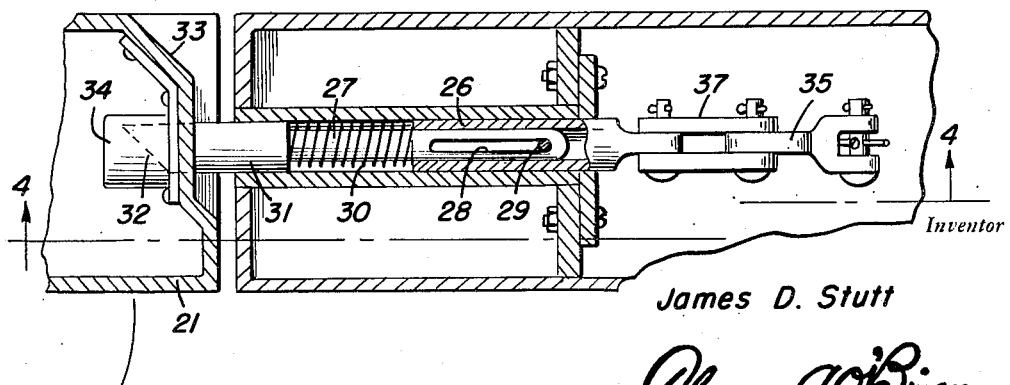
Inventor
James D. Stutt
By *Clarence A. O'Brien and Harvey B. Jacobson*
Attorneys

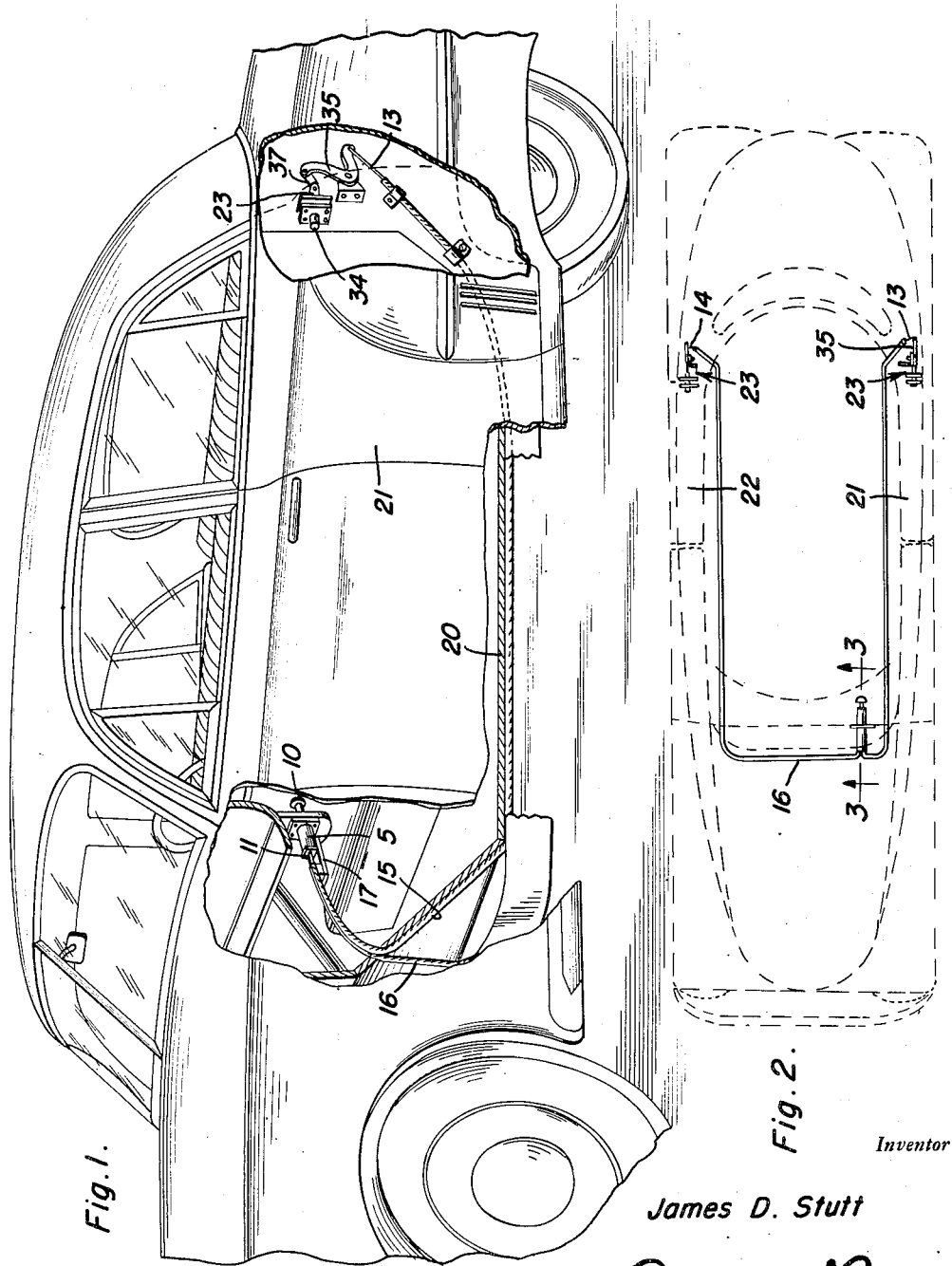

UNITED STATES PATENT OFFICE 2,612,397

AUTOMOBILE REAR DOOR LATCH

James D. Stutt, Paradise, Tex.

Application December 19, 1949, Serial No. 133,747

1 Claim. (Cl. 292—166)

The present invention relates to new and useful improvements for automobile door locks and more particularly to a lock for the rear doors of the automobile.

An important object of the invention is to provide locking means for the rear doors of an automobile and including the provision of a sliding bolt for each rear door connected through a handle or pull knob on the instrument panel of the automobile whereby the driver of the automobile may unlock the rear doors, when desired.

A further object of the invention is to provide a sliding bolt for locking the rear doors of the automobile which automatically locks the doors when the doors are moved into a closed position and safe from accidental opening movement by the occupant of the rear seat of the automobile and which may be unlocked only from the front seat of the vehicle.

A still further object is to provide a device of this character of simple and practical construction, which is efficient and reliable in operation, relatively inexpensive to manufacture and install in operative position and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view with parts broken away and shown in section and showing the cable connecting the lock to the pull knob or handle, Figure 2 is a top plan view, Figure 3 is an enlarged fragmentary sectional view taken substantially on the line 3—3 of Figure 2, Figure 4 is an enlarged vertical sectional view of one of the sliding bolts for the rear door, Figure 5 is a sectional view taken on a line 5—5 of Figure 4, and Figure 6 is a sectional view taken on a line 6—6 of Figure 3.

Referring now to the drawings in detail wherein for the purpose of illustration I have disclosed a preferred embodiment of the invention, the numeral 5 designates a tubular body or casing having an attaching flange 6 at one end for attaching to the rear of the instrument panel 7 of an automobile by means of screws or the like 8. A plunger 9 is slidably mounted in body 5 with a knob 10 at its outer end and positioned in front of the instrument panel and having a plunger head 11 secured to the inner end of the plunger by means of a screw 12 and positioned at the front end of body 5. A pair of wires or cables 13 and 14 are attached at one end in plunger head 11 and are slidably carried in flexible cable housings 15 and 16 which are secured at one end to a bracket 17 by means of clamps 18. The bracket is secured to the under side of tubular body 5 by screws or the like 19 to position the adjacent ends of housings 15 and 16 in spaced relation forwardly of plunger head 11.

Cables 13 and 14 and cable housings 15 and 16 extend rearwardly under the floor 20 of the automobile to a position adjacent the rear edges of the respective rear doors 21 and 22. Each cable 13 and 14 is attached at its rear end to a door locking bolt designated generally at 23, each bolt, and its actuating mechanism, being of duplicate construction and accordingly a detailed explanation of one will suffice for both.

The bolt is slidable in a tubular casing 24 secured in the door frame 25 and each bolt includes a rear tubular section 26 and a front solid section 27 having its rear or inner end slidably positioned in rear section 26.

The inner end of front section 27 is formed with a longitudinal slot 28 and rear section 26 is provided with a transverse pin 29 positioned in the slot to connect the section 27 for independent sliding movement to section 26 of the bolt. A coil spring 30 is held on section 27 of the bolt with one end abutting the front end of section 26 and its other end abutting a head 31 on the section 27.

The other end of head 31 is beveled as shown at 32 for riding against the inclined keeper plate 33 to enter a thimble 34 secured in one of the doors.

A substantially bell crank lever 35 is pivoted to a bracket 36 on door frame 25 adjacent bolt 23 and with one end of the lever connected to rear end of bolt 23 by a link 37 and the other end of the lever connected to one of the cables 13 or 14.

In the operation of the device the door is automatically locked when swinging into a closed position by head 31 of the bolt entering the thimble 34. The front end 27 and head 31 of the bolt is free to slide in the rear end 26 of the bolt during the door closing movement independently of the movement of rear end 26 of the bolt.

When it is desired to unlock the door knob 10 is pulled outwardly from dash 7 and cables 13 and 14 connected to bell crank levers 35 for the respective doors will retract the bolt, pin 29 connecting the front and rear sections 26 and 27 of the bolt for uniform retracting movement.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A door latch for latching the rear door of an automobile to the automobile frame comprising a horizontal latch bolt adapted to be mounted in said frame for movement into and out of locking engagement with said rear door, said latch bolt having front and rear ends, a manually operative latch bolt retracting member adapted to be slidably mounted in the frame for retraction, and means for moving said latch bolt out of locking engagement by manual retraction of said retracting member comprising a bell crank having a pivotal mounting on said frame, a motion transmitting link connected at one end to one end of said bell crank and at its other end to the rear end of said latch bolt and compensating for pivoting of said bell crank relative to said latch bolt, and a flexible pull member having one end connected to the other end of said bell crank and its other end connected to the bolt retracting member.

JAMES D. STUTT.

REFERENCES CITED

The following references are of record in the file of this patent:

UNITED STATES PATENTS

| Number | Name | Date |
|---|---|---|
| 555,350 | Wassmann | Feb. 25, 1896 |
| 1,134,175 | Wheary | Apr. 6, 1915 |
| 1,873,653 | Lyles et al. | Aug. 23, 1932 |